(12) United States Patent
Mendes

(10) Patent No.: US 12,309,686 B2
(45) Date of Patent: May 20, 2025

(54) MESSAGE PASSING SYSTEM FOR THE ALLOCATION OF RESOURCES IN DATA NETWORKS

(71) Applicant: Airbus (S.A.S.), Blagnac (FR)

(72) Inventor: Paulo Mendes, Munich (DE)

(73) Assignee: Airbus (S.A.S.), Blagnac (FR)

( * ) Notice: Subject to any disclaimer, the term of this patent is extended or adjusted under 35 U.S.C. 154(b) by 394 days.

(21) Appl. No.: 17/846,858

(22) Filed: Jun. 22, 2022

(65) Prior Publication Data
US 2022/0417830 A1    Dec. 29, 2022

(30) Foreign Application Priority Data

Jun. 23, 2021   (EP) ..................................... 21181282

(51) Int. Cl.
*H04W 40/24*  (2009.01)
*H04B 7/185*  (2006.01)
*H04W 40/12*  (2009.01)

(52) U.S. Cl.
CPC ...... *H04W 40/246* (2013.01); *H04B 7/18506* (2013.01); *H04W 40/12* (2013.01)

(58) Field of Classification Search
CPC ... H04W 40/246; H04W 40/12; H04W 8/005; H04B 7/18506; H04L 47/726
See application file for complete search history.

(56) References Cited

U.S. PATENT DOCUMENTS

| 6,256,309 B1* | 7/2001 | Daley ..................... H04L 45/00 370/395.43 |
| 8,665,841 B1* | 3/2014 | Goel ....................... H04L 45/26 370/327 |
| 2007/0097892 A1* | 5/2007 | Tsang ..................... H04W 8/04 370/310 |

(Continued)

FOREIGN PATENT DOCUMENTS

| EP | 3249942 A1 * | 11/2017 | ................. B64F 5/60 |
| WO | WO-2008074959 A2 * | 6/2008 | ......... H04L 12/5695 |
| WO | WO 2017/004353 A1 | 1/2017 | |

OTHER PUBLICATIONS

Minet Pascale et al, "Adaptive wireless sensor networks for Aircraft," 2015 IEEE International Conference on Wireless for Space and Extreme Environments (WISEE), IEEE, Dec. 14, 2015, pp. 1-6.

(Continued)

*Primary Examiner* — Marisol Figueroa
(74) *Attorney, Agent, or Firm* — KDW Firm PLLC

(57) ABSTRACT

Systems and methods for allocating data transmission resources in a data network with a plurality of access points (AP). A first AP sends a discovery message including an identifier of a destination AP to all available neighbor APs of the first AP. The discovery message is forwarded by all APs to other neighbor APs. Each AP adds an identifier to the discovery message to create a list of visited APs for each discovery message. When a discovery message arrives at the destination AP, the destination AP selects a plurality of paths through the data network based on the data carried by the (Continued)

discovery message, and triggers a message passing system to setup resources for a first data transmission class while sending a reservation message the reverse direction through the data network.

15 Claims, 2 Drawing Sheets

(56) References Cited

U.S. PATENT DOCUMENTS

| | | | |
|---|---|---|---|
| 2013/0215739 A1* | 8/2013 | Zhang | H04W 28/021 370/231 |
| 2015/0207724 A1 | 7/2015 | Choudhury et al. | |
| 2015/0326441 A1* | 11/2015 | Smith | H04L 45/125 370/255 |

OTHER PUBLICATIONS

European Search Report for Application No. EP 21181282 dated Nov. 25, 2021.

* cited by examiner

MESSAGE PASSING SYSTEM FOR THE ALLOCATION OF RESOURCES IN DATA NETWORKS

CROSS-REFERENCE TO RELATED APPLICATION

This application claims priority to EP 21181282.1 filed Jun. 23, 2021, the entire disclosure of which is incorporated by reference herein.

TECHNICAL FIELD

The description relates to a method for allocating data transmission resources in a data network with a plurality of access points, particularly access points that are connected with each other in a wireless manner, to a data network with a plurality of access points and a plurality of end devices, and an aircraft with such a data network.

BACKGROUND

Typically, when data packets are transmitted via a data network, resources are allocated for certain devices, applications, traffic classes, or the like, in order to provide a required quality of service to the devices connected to and utilizing services of the data network.

In wireless networks, a set of wireless devices are able of exchanging data packets via their wireless interface, as defined in the IEEE 802.11 standards, for example.

SUMMARY

It may be seen as an object to support low latency and highly reliable communications over a wireless network made of a plurality of interconnected data network nodes. This object is solved by the subject matter disclosed herein.

A method for allocating data transmission resources in a data network with a plurality of access points is provided. Further developments can be derived from the following description. Furthermore, a data network is provided that substantially implements the method indicated above. An aircraft is provided that includes such a data network.

Many of the features described with reference to the method may be implemented as functions of the data network, or vice versa. Therefore, the description provided in the context of the method applies in an analogous manner also to the data network and its components.

According to an aspect, a method for allocating data transmission resources in a data network with a plurality of access points that are interconnected with each other is provided. A first access point is connected to at least one neighbor access point via a data connection. The method comprises at least the following steps: sending, by the first access point, a discovery message to the at least one neighbor access point, wherein the discovery message includes an identifier of a destination access point; forwarding, by the at least one neighbor access point, the discovery message via all of its interfaces to other neighbor access points, except for the interface via which the discovery message was received; adding, by each access point, an identifier of this access point to the discovery message to create a list of visited access points for the discovery message; selecting, by the destination access point, a plurality of paths through the data network based on transmission requirements predetermined for data transmission between the first access point and the destination access point, and creating a first group of paths that includes the selected paths through the data network; triggering, by the destination access point, a message passing system to setup resources for a first data transmission class while following a path through the data network the reverse direction to the first access point, wherein the message passing system is defined by a reservation message that includes an identifier of the first access point, an identifier of the destination access point, the first data transmission class, a list of access points passed by the discovery message, and an amount of bandwidth to reserve for the first data transmission class.

Particularly, the method is applied to a data network with a plurality of access points that are interconnected with one another in a wireless manner, for example implementing the Orthogonal Frequency-Division Multiple Access (OFDMA) digital modulation scheme. The data network may be a mesh wireless network or a wireless ad-hoc network.

OFDMA is a good candidate for the development of low latency wireless systems, since it allows simultaneous transmissions to and from several devices connected to the same access point. In the presence of several access points, current standards such as IEEE 802.11 ax use a contention mechanism to avoid interferences between the different access points. In such scenario, with several access points, each one of the access points operates in isolation, being connected to a wired network in order to exchange data among them or/and to a system gateway.

The method described herein aims to exploit the capability of wireless data transmission and network standards, such as, for example, IEEE 802.11ax, to allow access points to exchange data among themselves wirelessly at the same time while data is transmitted and received from local wireless devices (end devices that are connected to one of the access points). This can be achieved via the allocation of a set of frequency sub-carriers (tones) not only to local wireless devices, but also to neighbor access points.

The method described herein generally proposes exchanging of relevant data packages, i.e., the discovery message and the reservation message, between the first access point (source) and the destination access point, with the discovery message and the reservation message containing information as described above. The discovery message is transmitted to the destination access point via several possible routes through the data network, and the reservation message is sent back to the source, including initiating reservation of resources on the way back.

A data connection may also be referred to as a link and is a set of subcarriers allocated to a neighbor access point or to end devices that are connected to an access point. Resources are typically allocated for a predetermined number of selected paths between a source access point and a destination access point. A path defines a route of a data packet through the data network and is characterized by indicating the intermediate access points, the order in which to pass the intermediate access points from the source to the destination, and which data connection between two neighbor access points to take.

According to an embodiment, a path through the network indicates a route from the first access point to the destination access point including an order of intermediate access points to be passed on the route.

According to a further embodiment, the plurality of paths through the data network are defined on layer 2 of an OSI protocol stack of the data network and the plurality of access points.

The OSI model (Open Systems Interconnection model) or OSI protocol stack is a model that standardizes the communication functions of data receiving/transmitting devices without regard to the underlying structure and technology. Layer 2 is the so-called data link layer and provides node-to-node data transfer via a link between two directly connected nodes. Layer 2 does not interconnect the source and the destination when additional nodes are located on the path between the source and the destination. The path from the source to the destination is composed of multiple layer 2 links, wherein each layer 2 link connects only those nodes that are direct neighbors, i.e., directly connected with each other with no intermediate node in between.

According to a further embodiment, the transmission requirements predetermined for data transmission between the first access point and the destination access point are defined by at least one of the following parameters: a number of visited intermediate access points; minimum signal to noise ratio over all passed data connections; and minimum available bandwidth over all passed data connections.

According to a further embodiment, the discovery message includes the identifier of the first access point, the identifier of the destination access point, the first data transmission class, a field for entering the list of access points passed by the discovery message, minimum signal to noise ratio of all passed data connections, minimum available bandwidth of all passed data connections.

According to a further embodiment, for creating the first group of paths, the destination access point selects each path whose transmission bandwidth is greater than a predetermined bandwidth threshold value.

According to a further embodiment, the predetermined bandwidth threshold value is at least the bandwidth required for transmitting data packets of the first data transmission class.

According to a further embodiment, the method further comprises creating a subset of paths from the first group of paths considering at least one of the following requirements: minimizing the number of hops of a path; maximizing the minimum signal to noise ratio; minimizing the number of common data connections between the paths of the subset; maximizing the available bandwidth.

According to a further embodiment, the method further comprises setting up resources for a plurality of different data transmission classes of data traffic with different performance requirements in each data connection between the first access point and the destination access point.

According to another aspect, a data network is provided. The data network comprises a plurality of access points and a plurality of end devices. Each end device is wirelessly connected to at least one access point. Each access point comprises at least one data transmission interface. Each access point is wirelessly connected to at least one other access point via one of the data transmission interfaces. A first access point is configured to send a discovery message to at least one neighbor access point, wherein the discovery message includes an identifier of a destination access point. The at least one neighbor access point is configured to forward the discovery message via all of its data transmission interfaces to other neighbor access points, except for the interface via which the discovery message was received. Each access point is configured to add an own identifier to the discovery message to create a list of visited access points for the discovery message. The destination access point is configured to select a plurality of paths through the data network based on transmission requirements predetermined for data transmission between the first access point and the destination access point, and to create a first group of paths that includes the selected paths through the data network. The destination access point is configured to trigger a message passing system to setup resources for a first data transmission class while following a path through the data network the reverse direction to the first access point, wherein the message passing system is defined by a reservation message that includes an identifier of the first access point, an identifier of the destination access point, the first data transmission class, a list of access points passed by the discovery message, and an amount of bandwidth to reserve for the first data transmission class.

The data network described herein particularly implements the steps of the method described above. Therefore, for the sake of brevity, the individual steps and functions are not repeatedly described here, and reference is made to the method.

According to an embodiment, the plurality of paths through the data network are defined on layer 2 of an OSI protocol stack of the data network and the plurality of access points.

According to a further embodiment, the transmission requirements predetermined for data transmission between the first access point and the destination access point are defined by at least one of the following parameters: a number of visited intermediate access points; minimum signal to noise ratio over all passed data connections; and minimum available bandwidth over all passed data connections.

According to a further embodiment, the discovery message includes the identifier of the first access point, the identifier of the destination access point, the first data transmission class, a field for entering the list of access points passed by the discovery message, minimum signal to noise ratio of all passed data connections, minimum available bandwidth of all passed data connections.

According to another aspect, an aircraft with a data network as described herein is provided.

In a preferred use case, the data network may be implemented in an aircraft to interconnect aircraft devices and passenger devices. For example, the data network may communicatively interconnect sensors (data producers) and actuators or control devices (data consumers). Furthermore, the data network may allow passenger devices to establish a data connection and access (local or global) services provided by the aircraft to the passengers. The end devices may be connected in a wireless manner to one or more data network nodes. Examples for sensors are smoke detection sensors, temperature sensors, or fuel gauging sensors. Examples for actuators are control surfaces, heaters, lights, or any other devices in a passenger service unit. Control devices may also be connected to the data network and configured to receive a command by an operator (passenger or crew) and transmit the command to an end device to execute a function.

According to an embodiment, a first end device is a sensor located in the aircraft and arranged to sense a physical parameter of a component of the aircraft, and a second end device is an actuator located in the aircraft and arranged to initiate a function of a component of the aircraft.

While certain examples of the method for allocating data transmission resources and examples of the data network are described with reference to an aircraft, it is noted that the method and the data network are not limited for being used in aircraft. Rather, the method and the data network may be implemented in any scenario encompassing a data network (mesh or ad-hoc wireless data network) that interconnects static or dynamic devices by using network nodes that are static or assigned to a dynamically moving unit (any type of land vehicle, watercraft, aircraft).

BRIEF DESCRIPTION OF THE DRAWINGS

The subject matter will hereinafter be described in conjunction with the following drawing figures, wherein like numerals denote like elements, and wherein.

DETAILED DESCRIPTION

Figure 1:
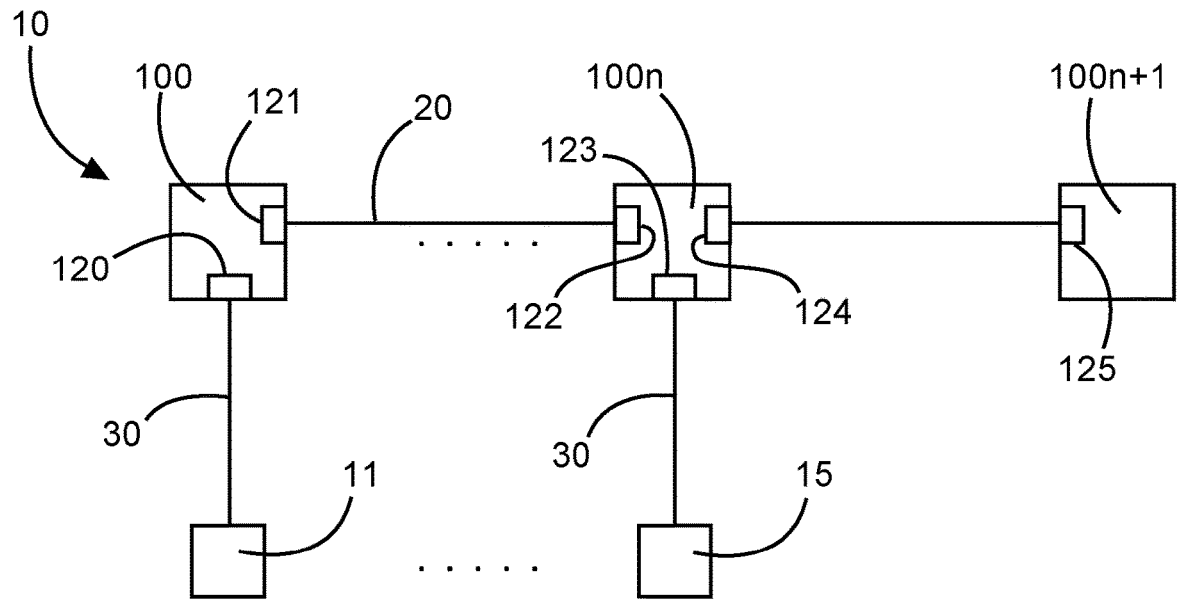
FIG. 1 is a schematic representation of a data network.

The following detailed description is merely as examples in nature and is not intended to limit the disclosure herein and uses of the disclosure herein. Furthermore, there is no intention to be bound by any theory presented in the preceding background or the following detailed description.

The representations and illustrations in the drawings are schematic and not to scale. Like numerals denote like elements.

A greater understanding of the described subject matter may be obtained through a review of the illustrations together with a review of the detailed description that follows.

FIG. 1 shows a data network 10 that includes a plurality of access points 100, 100$n$, 100$n$+1. The access points 100, 100$n$+1 are interconnected with each other by wireless data connections 20. Although FIG. 1 seems to suggest that the access points are interconnected in a bus-like manner, it is noted that this connection scheme is used merely for representation of the data network 10. In fact, the plurality of access points may be interconnected with each other utilizing different connection schemes. In this example, the access points are interconnected in a meshed network manner, e.g., each access point may be connected to at least two neighbor access points so that multiple different paths through the data network can be provided between each selected pair of two access points.

Each access point 100 includes at least one interface 120 to 125. Directly neighbored access points are connected by a direct link that is established between an interface of the first access point and an interface of the second access point. For example, the access point 100 is connected via the interface 121 to the interface 122 of the access point 100$n$.

End devices 11 and 15 are connected to at least one access point via interfaces 120, 123. In this example, the end devices 11, 15 are connected to the access points via wireless data connections 30.

Figure 2:
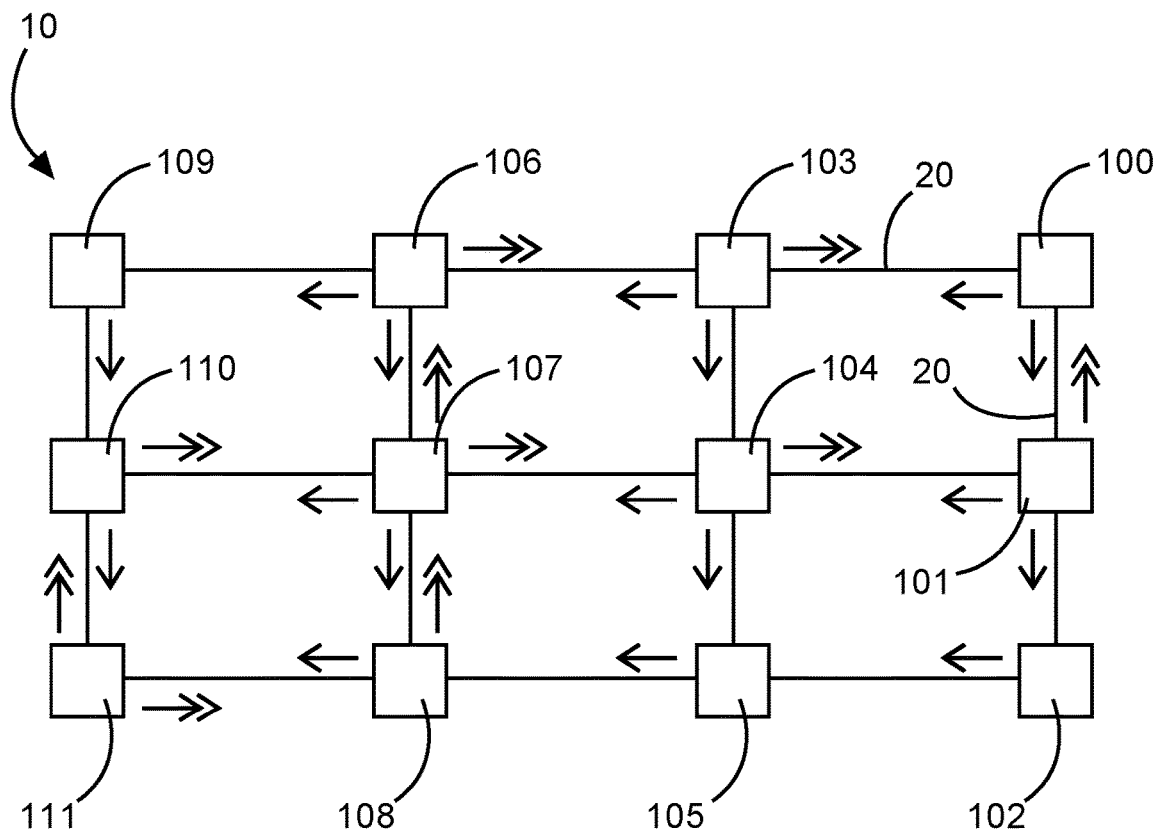
FIG. 2 is another schematic representation of a data network.

FIG. 2 schematically shows a data network 10 with the access points 100 to 111. While end devices are not shown in FIG. 2, it should be understood that one or multiple end devices may establish a data connection to any one of the access points so that the end device is able to receive and transmit data via the data network 10.

Although the devices 100 to 111 are called access points, they may generally be referred to as data network nodes that are configured to route a packet that arrives at an interface of the data network node via an input link to another interface and an output link. Some of the access points 100 to 111 may be configured to establish a connection to end devices 10, 11 and additionally to at least one neighbor node while other access points 100 to 111 may be configured for establishing a connection to other (neighbor) access points only.

The data network 10 is a wireless mesh network, meaning that the access points 100 to 111 are interconnected with each other via wireless data connections 20. The wireless connections 20 may be based on IEEE 802.11 standards. In other examples, the data network 10 may be a wireless ad-hoc network.

The wireless data connections 20 may use an OFDMA modulation scheme, which is a good candidate for development of low latency wireless systems, since it allows simultaneous transmissions to and from several devices connected to the same access point.

In the presence of several access points, current standards such as IEEE 802.11ax use a contention mechanism to avoid interferences between the different access points. In such scenario, with several access points, each one operates in isolation, being connected to a wired network in order to exchange data among them or/and to a system gateway. The data network 10 proposed herein aims to exploit the capability of data networks to allow access points to exchange data among themselves wirelessly at the same time while data is transmitted and received from local wireless devices. This can be achieved via the allocation of a set of frequency sub-carriers (tones) not only to local devices, but also to neighbor access points.

Moreover, in order to support different types of traffic, each one with different performance requirements (e.g., throughput, delay), networking systems, wired or wireless, can apply a set of networking queues and traffic schedulers to segregate different type of traffic. In a mesh networking scenario, the challenge relates to the capability of performing an efficient allocation of queueing resources among a set of disjoint network access points. Normally this problem is solved on layer 3 of the OSI protocol stack, via the implementation of two different protocols: a routing protocol able to set up routes (one or many) between different parts of the network; a resource reservation protocol able of allocating the right set of resources along the selected path(s). However, implementing this solution on layer 3 may result in higher complexity due to the need to maintain the state of two different networking protocols. Moreover, desynchronization between both protocols may lead to a situation where the system may not converge to a stable situation. This potential issue on OSI layer 3 is avoided by using a layer 2 protocol able of finding potential paths between any wireless devices and to allocate resources needed for each traffic class in a sub-set of the identified paths, aiming to achieve the needed reliability level. The proposed protocol avoids the need to deploy a routing protocol, simplifying the development of wireless nodes (e.g., no routing tables are needed, nor message passing to keep those tables updated).

The data network 10 supports low latency and highly reliable communications over a wireless network made of a set of interconnected wireless nodes (e.g., IEEE 802.11ax access points). This data network 10 allows such wireless mesh network to be used by a set of applications, with distinct traffic requirements, operating between any part of wireless devices. The data network 10 provides the needed set of networking resources of different types of traffic along a set of multiple paths without the need to deploy a routing protocol. The data network 10 allows the deployment of wireless avionics intra-communication systems (WAIC) based on more than one access point. Beside WAIC systems, the data network 10 supports any type of low latency wireless system based on more than one OFDMA system, namely external avionics communications, and other industrial systems. The data network 10 aims to work on top of existing OFDMA systems, such as IEEE 802.11ax or 5G, allowing them to support low latency multi-hop wireless communications.

The data network 10 implements a mechanism able of allocating network resources among a set of meshed wireless access points in order to support a set of applications with different traffic requirements over a set of multiple paths. By setting up the required set of resources over available network paths, the data network 10 ensures that applications will be able of using the required set of resources (e.g., queue size and scheduling) in a reliable way (over multiple disjoint paths).

It is assumed that such wireless system encompasses several access points 100 (AP) or base stations (BS) that communicate between each other wirelessly. Since a regular OFDMA system typically considers only one wireless interface, an access point 100 to 111 of the data network 10 does not make a distinction between a local client (or local devices, i.e., an end device 11, 15, e.g., sensor; actuator) and a neighbor access point, while assigning wireless resource units (RU). In order to allow the exchange of data among neighbor access points, while not affecting the latency of local communications, it is assumed the deployment of one of the following two options:

Option 1: updating OFDMA systems (e.g., IEEE 802.11ax) to allow the allocation of RU to neighbor access points as well as to local devices. This means that neighbor access points are treated as another local device. In this case, incoming traffic is controlled as a case of uplink traffic for local devices, meaning that an access point pulls data from neighbor access points via a signaling mechanism such as an IEEE 802.11ax trigger frame.

Option 2: operation of OFDMA systems is extended by virtualizing the wireless interface. In this case, the access point comprises one air interface which is separated into multiple virtual interfaces. Local devices are served by a virtual interface which control a pre-defined set of sub-carriers. The remaining set of sub-carriers is distributed among the set of neighbor access points, thereby avoiding inter-access-point interference. By assigning different sets of sub-carriers to different virtual interfaces, simultaneous transmissions are allowed between neighbor APs and to/from local devices.

Based on the above described network setting, the data network 10 aims to setup resources to be used for different classes of traffic in each wireless link. In this case a link is understood as a set of subcarriers allocated to a neighbor access point or to local devices. The setup of resources is based on the requirements of different applications, aiming to avoid bottlenecks. Moreover, resources are allocated over a number of X selected paths, where X is a configuration parameter of the overall system.

The method for allocating data transmission resources in the data network 10 is executed by each access point 100 to 111 in three phases:

Phase 1: Allowing the access point 100 to 111 to know all possible paths to/from another access point; In this phase, each potential path is characterized by a set of parameters, such as: number of visited access points (i.e., number of access points along the path); minimum signal to noise ratio over all visited links (where a link is a data connection between two direct neighbor access points); minimum available bandwidth over all visited links.

In the first phase, the access points (e.g., source access point 100 in FIG. 2) use a message passing system, where a discovery message (DiscoveryMSG, indicated by single-headed arrows starting at the source access point 100 and pointing towards the destination access point 111), is sent over all potential interfaces of the respective access point (it is noted that the interfaces are not shown in FIG. 2; however, an access point comprises an interface for each data connection 20 connected to that access point), with the exception of the interface from which the DiscoveryMSG was received. The DiscoveryMSG encompasses the following information: source and destination tuple; traffic class; list of visited access points; minimum signal to noise ratio of all visited links; minimum available bandwidth of all visited links.

Phase 2: From all potential paths, the access point that received a DiscoveryMSG with its address, i.e., with the address of the receiving access point, in the destination field (e.g., the destination access point 111 in FIG. 2) selects a set of paths, with the number of paths being a configuration parameter of the data network 10. In this phase, each path is considered if the bandwidth of its bottleneck is greater than the bandwidth needed for the respective traffic class. From the paths to be considered, the access point 111 selects a set of paths such that: the number of hops (number of access points passed when transmitting a data packet along the respective path) is kept to a minimum value; maximizes the minimum signal to noise ratio; minimizes the number of common links between all the selected paths; maximizes the available bandwidth.

Phase 3: The access point that received a DiscoveryMSG with its address in the destination field (e.g., the destination access point 111 in FIG. 2) triggers a message passing system to setup resources for a given traffic class while following the reverse path towards the device whose address came in the source field of the DiscoveryMSG, i.e., the address of the source access point 100. The message passing system is defined by a reservation message (ReservationMSG, indicated by double-headed arrows starting at the destination access point 111 and pointing towards the source access point 100) encompassing the following information: source and destination tuple (source is equal the destination field of the DiscoveryMSG, and the destination equals the source field of the DiscoveryMSG); data traffic class; list of access points visited by the DiscoveryMSG (this information is used to decide about the next hop along the reverse path); bandwidth to reserve for the traffic class.

While the function of the data network 10 and of the individual access points 100 to 111 are described with reference to FIG. 2, a particular embodiment of a method for allocating data transmission resources in a meshed network 10 with a plurality of access points 100 to 111 is now described with reference to FIG. 3.

Figure 3:
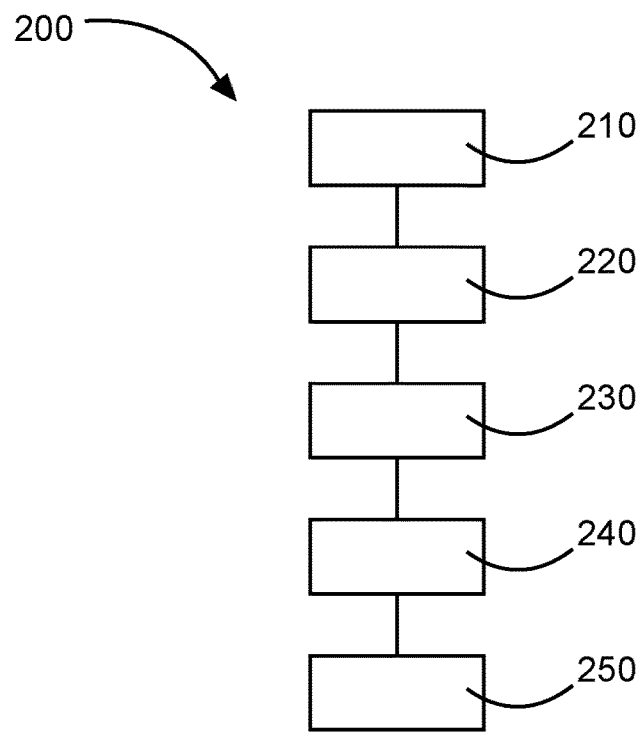
FIG. 3 is a schematic representation of the steps of a method for allocating data transmission resources in a data network with a plurality of access points.

FIG. 3 schematically shows the steps 210 to 250 of a method 200 for allocating data transmission resources in a meshed network 10 (like the data network 10 described with reference to FIGS. 1 and 2) with a plurality of access points 100 to 111 that are interconnected with each other.

The method 200 includes at least the following steps:

In a first step, indicated by 210, sending, by a first access point 100, a discovery message to at least one neighbor access point 101 to 110, wherein the discovery message includes an identifier of a destination access point 111.

In a second step, indicated by 220, forwarding, by the at least one neighbor access point 101 to 110, the discovery message via all of the interfaces 120 to 125 of the neighbor access point to other neighbor access points of the current neighbor access point, except for the interface via which the discovery message was received. For example, with reference to FIG. 2, access point 103 forwards the discovery message towards the access points 104 and 106, but not to 100 because the access point 103 has received the discovery message from the interface that is connected to access point 100.

In a third step, indicated by 230, adding, by each access point, an identifier of this access point to the discovery message to create a list of visited access points for the discovery message.

As can be derived from FIG. 2, multiple discovery messages are passed through the data network 10, and each discovery message takes an individual route through the data network. Each discovery message carries a list of the passed access points to indicate the taken route including the order of the access points taken.

In a fourth step, indicated by 240, selecting, by the destination access point 111, a plurality of paths through the meshed network 10 based on transmission requirements predetermined for data transmission between the first access point 100 and the destination access point 111, and creating a first group of paths that includes the selected paths through the meshed network.

In other words, the destination access point 111 receives the plurality of discovery messages and determines the parameters of each route by scanning the data carried by the discovery messages. Based on these parameters, the destination access point 111 selects some of the taken paths for data transmission between the source access point 100 and the destination access point 111.

In a fifth step, indicated by 250, triggering, by the destination access point 111, a message passing system to setup resources for a first data transmission class while following a path through the meshed network 10 the reverse direction to the first access point 100, wherein the message passing system is defined by a reservation message that includes an identifier of the first access point, an identifier of the destination access point, the first data transmission class, a list of access points passed by the discovery message, and an amount of bandwidth to reserve for the first data transmission class.

The reservation message is sent back to the source access point 100 along the same path taken by the discovery message in the reverse order.

Figure 4:
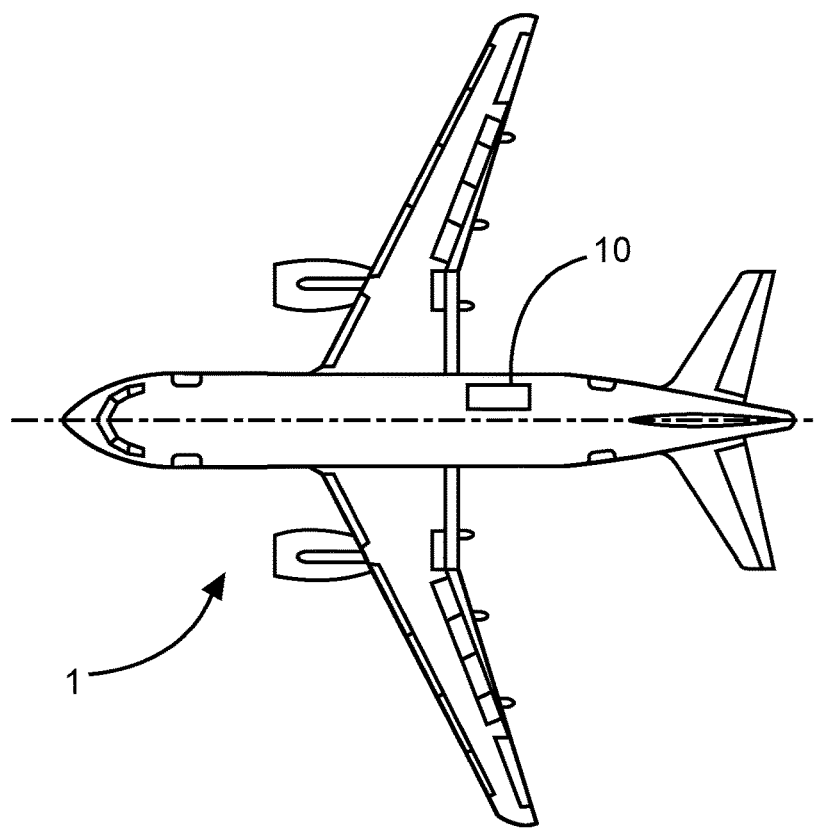
FIG. 4 is a schematic representation of an aircraft with a data network of FIG. 1 or FIG. 2.

FIG. 4 shows an aircraft 1 with a data network 10, for example the data network 10 shown in and described with reference to FIG. 1 and FIG. 2. The data network 10 may be applied to any aircraft, such as commercial airplanes. However, the data network described herein, and the related method may be applied to any wireless mesh network, indoor or outdoor, aiming to support different types of traffic, each one with different set of performance requirements. In aircraft, the data network 10 may support deployment of wireless communication systems for safety applications such as wireless avionics intra-communication, WAIC, where data needs to be exchanged between different parts of the network over a set of wireless links with high reliability and low delay.

The subject matter disclosed herein can be implemented in or with software in combination with hardware and/or firmware. For example, the subject matter described herein can be implemented in or with software executed by a processor or processing unit. In one example implementation, the subject matter described herein can be implemented using a computer readable medium having stored thereon computer executable instructions that when executed by a processor of a computer control the computer to perform steps. Example computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one example embodiment has been presented in the foregoing detailed description, it should be appreciated that a vast number of variations exist. It should also be appreciated that the example embodiment or example embodiments are only examples, and are not intended to limit the scope, applicability, or configuration of the disclosure herein in any way. Rather, the foregoing detailed description will provide those skilled in the art with a convenient road map for implementing an example embodiment of the disclosure herein. It will be understood that various changes may be made in the function and arrangement of elements described in an example embodiment without departing from the scope of the claims.

Additionally, it is noted that "comprising" or "including" does not exclude any other elements or steps and "a" or "an" does not exclude a multitude or plurality. It is further noted that features or steps which are described with reference to one of the above example embodiments may also be used in combination with other features or steps of other example embodiments described above. Reference signs in the claims are not to be construed as a limitation.

LIST OF REFERENCE SIGNS 1 aircraft
10 data network
11, 15 end device
20 data connection between access points,
30 data connection between access point and end device
100-111 access point
120-125 interface
200 method
210-250 method steps

The invention claimed is:

1. A method for allocating data transmission resources in a data network with a plurality of access points that are interconnected with each other, wherein a first access point is connected to at least one neighbor access point via a data connection, the method comprising:
sending, by the first access point, a discovery message to the at least one neighbor access point, wherein the discovery message includes an identifier of a destination access point;
forwarding, by the at least one neighbor access point, the discovery message via all of its interfaces to other neighbor access points, except for an interface via which the discovery message was received;
adding, by each access point, an identifier of the access point to the discovery message to create a list of visited access points for the discovery message;
selecting, by the destination access point, a plurality of paths through the data network based on transmission requirements predetermined for data transmission between the first access point and the destination access point, and creating a first group of paths that includes the selected paths through the data network; and triggering, by the destination access point, a message passing system to setup resources for a first data transmission class while following a path through the data network in a reverse direction to the first access point, wherein the message passing system is defined by a reservation message that includes an identifier of the first access point, the identifier of the destination access point, the first data transmission class, a list of access points passed by the discovery message, and an amount of bandwidth to reserve for the first data transmission class.

2. The method of claim 1, wherein a path through the network indicates a route from the first access point to the destination access point including an order of intermediate access points to be passed on the route.

3. The method of claim 1, wherein the plurality of paths through the data network are defined on layer 2 of an OSI protocol stack of the data network and the plurality of access points.

4. The method of claim 1, wherein the transmission requirements predetermined for data transmission between the first access point and the destination access point are defined by at least one of:
  a number of visited intermediate access points;
  minimum signal to noise ratio over all passed data connections; and
  minimum available bandwidth over all passed data connections.

5. The method of claim 1, wherein the discovery message includes the identifier of the first access point, the identifier of the destination access point, the first data transmission class, a field for entering the list of access points passed by the discovery message, minimum signal to noise ratio of all passed data connections, minimum available bandwidth of all passed data connections.

6. The method of claim 1, wherein, for creating the first group of paths, the destination access point selects each path whose transmission bandwidth is greater than a predetermined bandwidth threshold value.

7. The method of claim 6, wherein the predetermined bandwidth threshold value is at least the bandwidth required for transmitting data packets of the first data transmission class.

8. The method of claim 6, comprising creating a subset of paths from the first group of paths considering at least one of: minimizing a number of hops of a path; maximizing a minimum signal to noise ratio; minimizing a number of common data connections between the paths of the subset; maximizing an available bandwidth.

9. The method of claim 1, comprising setting up resources for a plurality of different data transmission classes of data traffic with different performance requirements in each data connection between the first access point and the destination access point.

10. A data network, comprising:
  a plurality of access points; and
  a plurality of end devices;
  wherein each end device is wirelessly connected to at least one access point;
  wherein each access point comprises at least one data transmission interface;
  wherein each access point is wirelessly connected to at least one other access point via one of the data transmission interfaces;
  wherein a first access point is configured to send a discovery message to at least one neighbor access point, wherein the discovery message includes an identifier of a destination access point;
  wherein the at least one neighbor access point is configured to forward the discovery message via all of its data transmission interfaces to other neighbor access points, except for an interface via which the discovery message was received;
  wherein each access point is configured to add an own identifier to the discovery message to create a list of visited access points for the discovery message;
  wherein the destination access point is configured to select a plurality of paths through the data network based on transmission requirements predetermined for data transmission between the first access point and the destination access point, and to create a first group of paths that includes the selected paths through the data network; and
  wherein the destination access point is configured to trigger a message passing system to setup resources for a first data transmission class while following a path through the data network in a reverse direction to the first access point, wherein the message passing system is defined by a reservation message that includes an identifier of the first access point, the identifier of the destination access point, the first data transmission class, a list of access points passed by the discovery message, and an amount of bandwidth to reserve for the first data transmission class.

11. The data network of claim 10, wherein the plurality of paths through the data network are defined on layer 2 of an OSI protocol stack of the data network and the plurality of access points.

12. The data network of claim 10,
  wherein the transmission requirements predetermined for data transmission between the first access point and the destination access point are defined by at least one of:
  a number of visited intermediate access points;
  minimum signal to noise ratio over all passed data connections; and
  minimum available bandwidth over all passed data connections.

13. The data network of claim 10, wherein the discovery message includes the identifier of the first access point, the identifier of the destination access point, the first data transmission class, a field for entering the list of access points passed by the discovery message, minimum signal to noise ratio of all passed data connections, minimum available bandwidth of all passed data connections.

14. An aircraft comprising a data network, the data network comprising:
  a plurality of access points; and
  a plurality of end devices;
  wherein each end device is wirelessly connected to at least one access point;
  wherein each access point comprises at least one data transmission interface;
  wherein each access point is wirelessly connected to at least one other access point via one of the data transmission interfaces;
  wherein a first access point is configured to send a discovery message to at least one neighbor access point, wherein the discovery message includes an identifier of a destination access point;
  wherein the at least one neighbor access point is configured to forward the discovery message via all of its data transmission interfaces to other neighbor access points, except for an interface via which the discovery message was received;

wherein each access point is configured to add an own identifier to the discovery message to create a list of visited access points for the discovery message;

wherein the destination access point is configured to select a plurality of paths through the data network based on transmission requirements predetermined for data transmission between the first access point and the destination access point, and to create a first group of paths that includes the selected paths through the data network; and wherein the destination access point is configured to trigger a message passing system to setup resources for a first data transmission class while following a path through the data network in a reverse direction to the first access point, wherein the message passing system is defined by a reservation message that includes an identifier of the first access point, the identifier of the destination access point, the first data transmission class, a list of access points passed by the discovery message, and an amount of bandwidth to reserve for the first data transmission class.

15. The aircraft of claim 14, wherein a first end device is a sensor located in the aircraft and arranged to sense a physical parameter of a component of the aircraft; and wherein a second end device is an actuator located in the aircraft and arranged to initiate a function of a component of the aircraft.

* * * * *